UNITED STATES PATENT OFFICE.

D. W. MESSER, OF BOSTON, MASSACHUSETTS.

IMPROVEMENT IN PROCESSES FOR HULLING COTTON-SEED.

Specification forming part of Letters Patent No. 13,317, dated July 24, 1855.

*To all whom it may concern:*

Be it known that I, DANIEL W. MESSER, of Boston, in the county of Suffolk and State of Massachusetts, have invented certain new and useful Improvements in the Preparation of Oil from Cotton-Seed, of which the following is a full, clear, and exact description.

The efforts heretofore made to render the seed of the cotton-plant available for the production of oil or for the purpose of feeding man or domestic animals have not been productive of any valuable results, owing to the nature of the shell by which the kernel is inclosed and the fibers of cotton which still adhere to it, both the fibers and the shell absorbing a large portion of the oil and rendering the cake unfit for feeding purposes.

My present invention has for its object the removal of the above objections; and it consists in the separation of the shell from the kernel previous to expressing the oil, which enables me to obtain a much larger quantity of oil, while the residuum or cake is left free from the shell or fibers to be used for feeding purposes.

To enable others skilled in the art to make use of my invention, I will proceed to describe the manner in which I have carried it out.

The shell of the cotton-seed is first softened by soaking it in water or by subjecting it to the action of steam. Where boiling water is used five minutes immersion, or thereabout, is sufficient. When cold water is employed a much longer time is necessary. The time required to soften different lots of seed varies with the amount of moisture in the seed. The seed is then passed through rollers, or is in some other manner subjected to pressure in small quantities at a time, by which means the shell is broken and the kernel is forced out. The kernel, with its shell, is then dried in the sun or by artificial heat, care being taken where the oil is to be used for culinary or table purposes that the temperature be not sufficiently high to roast the kernel. The kernel may then be separated from the shell by means of riddles or in any other efficient manner, and the oil expressed by passing the kernels between revolving rollers or through any suitable mill and subjecting them to pressure. The residuum, being free from the shell and from fiber, may be made available for feeding or other purposes.

I do not claim submitting cotton to pressure by passing it between rollers or otherwise for the purpose of extracting the oil therefrom. Neither do I claim subjecting the seed to the action of steam to facilitate the expression of the oil. Nor do I lay claim to any method of extracting or expressing oil from cotton or other seeds; but What I do claim as my invention, and desire to secure by Letters Patent, is—

Separating the kernel from its shell and fiber previous to expressing the oil by the method herein described, or by any other method substantially equivalent thereto, the seed being macerated to soften the shell and then submitted to pressure for the purpose of pressing out the kernel, in the manner and for the purpose substantially as herein set forth.

D. W. MESSER.

Witnesses:
JAMES B. BLAKE,
SAM. COOPER.